United States Patent [19]

Shinbori et al.

[11] Patent Number: 4,463,936
[45] Date of Patent: Aug. 7, 1984

[54] APPARATUS FOR CONTROLLING FRICTION BETWEEN THE LEAF SPRINGS OF A LAMINATED LEAF SPRING ASSEMBLY OF A VEHICLE

[75] Inventors: Takeyoshi Shinbori, Yokosuka; Ichiro Takadera, Tokyo; Takeo Fukumura, Yokohama, all of Japan

[73] Assignee: NHK Spring Co., Ltd., Yokohama, Japan

[21] Appl. No.: 415,344

[22] Filed: Sep. 7, 1982

[30] Foreign Application Priority Data

Jan. 28, 1982 [JP] Japan .................................. 57-12341

[51] Int. Cl.³ .......................... B60G 11/02; B62D 5/06
[52] U.S. Cl. .................................. 267/36 A; 180/132; 180/141; 267/48
[58] Field of Search ................... 267/36 A, 23, 24, 28, 267/31, 36 R, 48, 52, 53, 54 B, 182; 180/141, 132, 89.15

[56] References Cited

U.S. PATENT DOCUMENTS

| | | | |
|---|---|---|---|
| 3,173,669 | 3/1965 | Chutz | 267/52 |
| 3,294,390 | 12/1966 | Warmkesser | 267/31 |
| 3,730,549 | 5/1973 | Turner, Jr. | 267/31 |
| 4,022,449 | 5/1977 | Estorff | 267/48 |
| 4,174,016 | 11/1979 | Levington et al. | 180/89.15 |
| 4,216,841 | 8/1980 | Ontuka et al. | 180/141 |
| 4,345,661 | 8/1982 | Nishikawa | 180/141 |
| 4,418,896 | 12/1983 | Shinbori | 267/53 |
| 4,433,833 | 2/1984 | Tabe et al. | 267/18 |

FOREIGN PATENT DOCUMENTS 55-93747 12/1978 Japan .
5680536 12/1979 Japan .
5687643 12/1979 Japan .

Primary Examiner—Bruce H. Stoner, Jr.
Assistant Examiner—Robert J. Oberleitner
Attorney, Agent, or Firm—Frishauf, Holtz, Goodman & Woodward

[57] ABSTRACT

An apparatus for controlling the friction between the leaf springs of a laminated leaf spring assembly comprises a clamping mechanism, a hydraulic cylinder mechanism, a hydraulic control mechanism and a detecting mechanism. The clamping mechanism includes a guide member and a press member. The guide member and the press member hold and clamp the laminated leaf spring assembly. The detecting mechanism detects the values of the predetermined factors of a body supported by the laminated leaf spring assembly and supplied signals representative of the values to the pressure reducing valve. According to the signals from the detecting mechanism the pressure reducing valve controls the pressure of the liquid supplied to the cylinder of the hydraulic cylinder mechanism. The detecting mechanism includes a pressure sensor for sensing the pressure of the compressed oil acting on the power steering assembly and a comparator for comparing a signal from the pressure sensor with a predetermined value and for supplying a signal corresponding to the sensed pressure to the control valve when the sensed pressure exceeds the predetermined value.

3 Claims, 2 Drawing Figures

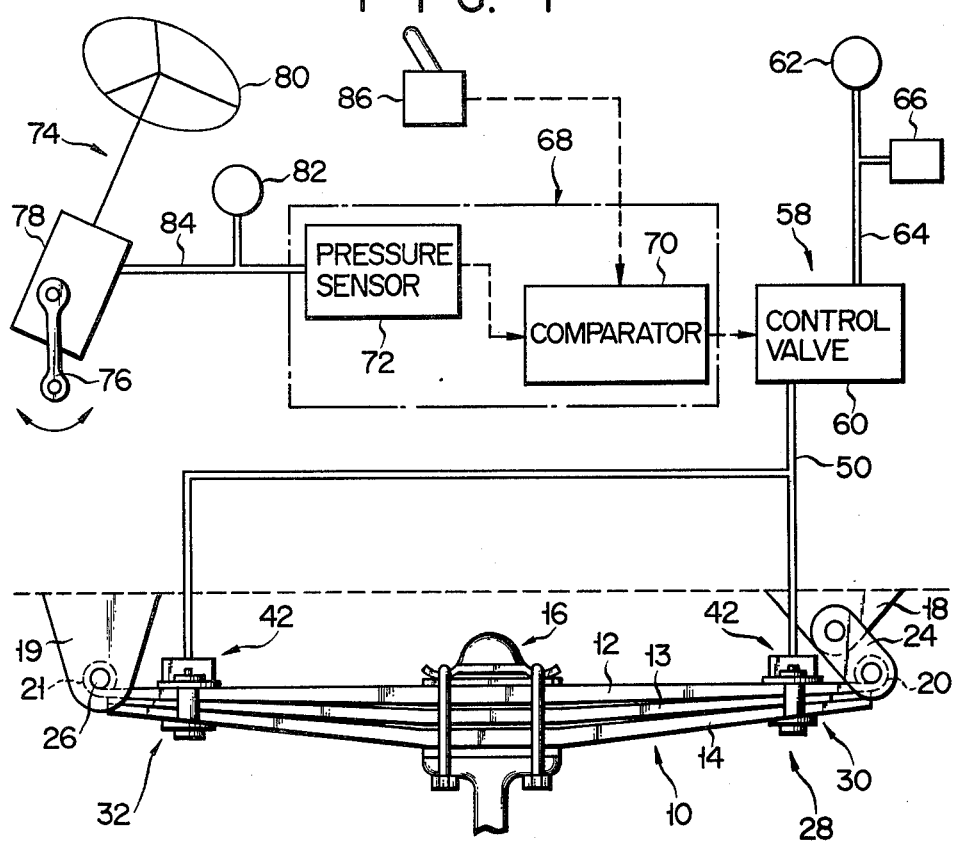
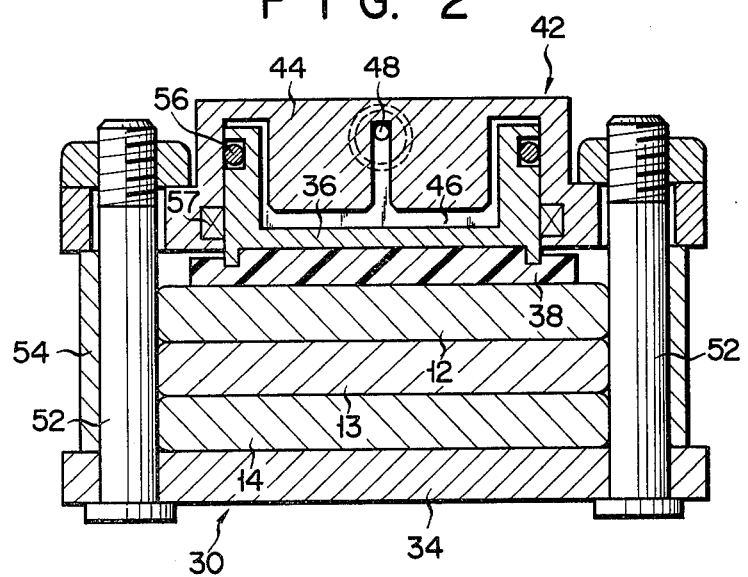

4,463,936

APPARATUS FOR CONTROLLING FRICTION BETWEEN THE LEAF SPRINGS OF A LAMINATED LEAF SPRING ASSEMBLY OF A VEHICLE

BACKGROUND OF THE INVENTION

The present invention relates to an apparatus for controlling the friction between the leaf springs of a laminated leaf spring assembly of a vehicle in accordance with the state of a body to be supported.

A laminated leaf spring assembly comprising a number of leaf springs is widely used for suspending a body of a large vehicle such as a truck or a bus. When the laminated leaf spring assembly suspends the body of a vehicle, the driver's comfort and the driving stability of the vehicle depend on the spring constant of the assembly and the frinction between the leaf springs of the assembly. Of course they depend on the condition of the road as well. When the vehicle runs on a smooth road, the smaller the friction between the leaf springs, the more comfort the driver will have. However, the larger the friction between the leaf springs, the easier it is for the driver to drive the vehicle. The driver's comfort is considered more important than the driving stability of the vehicle as long as the vehicle runs on a smooth road. This is because a sufficient driving stability is ensured unless the steering wheel is suddenly turned.

In order to increase the friction between the leaf springs the leaf springs are clamped together by a clamping means at both end portions. The conventional clamping means is bolts that can clamp the lead springs tight enough to increase the friction to such an extent that the driver's comfort is ensured while the vehicle runs on a rough road. However, the bolts do not provide for driver comfort while the vehicle runs on a smooth road.

SUMMARY OF THE INVENTION

It is therefore an object of the invention to provide an apparatus for contolling the friction between the leaf springs of a laminated leaf spring assembly of a vehicle, which can optimize the friction according to the state of a body to be supported by the spring assembly.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

BRIEF DESCRIPTION OF THE DRAWINGS

FIG. 1 is a partial front view of a laminated leaf spring assembly and a partial block diagram of an apparatus for controlling the friction between the leaf springs of the laminated leaf spring assembly according to a first embodiment of the present invention; and FIG. 2 is a longitudinal sectional view of a clampling means and hydraulic cylinder means incorporated in the apparatus.

DETAILED DESCRIPTION OF THE PREFERRED EMBODIMENT

Referring to FIG. 1, a laminated leaf spring assembly 10 includes three leaf springs 12, 13 and 14. The springs 12, 13 and 14 are tapered leaf springs. However, they may be replaced by partially tapered leaf springs or leaf springs of a uniform thickness. The leaf springs 12, 13 and 14 have substantially the same length. But they may be replaced by leaf springs of different lengths which are laminated in a stepped form. The springs 12, 13 and 14 are clamped at the middle portion by a U-bolt assembly 16, with the clamping force acting on them in the direction of thickness of the assembly 10 as in the prior art leaf spring assembly. If used for suspending a vehicle body, the laminated leaf spring assembly 10 is connected to a rear axle (not shown) of the vehicle body by, for example, the U-bolt 16.

The respective ends of the laminated leaf spring assembly 10 are coupled to the vehicle body by the brackets 18 and 19. The upper leaf spring 12 has at the both ends spring eyes 20 and 21 integrally formed thereto. The spring eye 20 is movably attached to the bracket 18 by a shackle 24 and the spring eye 21 is pivotably supported on the bracket 19 by a pin 26.

An apparatus 28 is provided which controls the friction between the leaf springs 12, 13 and 14. The apparatus 28 comprises a pair of clamping means 30 and 32 which are disposed at the respective ends of the laminated leaf spring assembly 10. One of the clamping means may be omitted. The clamping means are of the same construction and serve to exert clamping force on the leaf springs 12, 13 and 14 in the direction of their thickness and to permit the springs 12, 13 and 14 to slide relative to one another.

The construction of the clamping means 30 will be described below. As shown in FIG. 2, the clamping means 30 includes a spring supporting member 34 which can abut against the lower surface of the leaf spring 14, and a press member 36 for pressing against the upper surface of the leaf spring 12 through an intermediate member 38. The spring supporting member 34 and the press member 36 hold and clamp the leaf springs 12, 13 and 14 therebetween. The intermediate member 38 is made of, for example an elastic material such as hard rubber so as to permit the sliding movement of the leaf spring 12 relative to the press member 34.

A pair of hydraulic cylinder means 42 are mounted on the clamping means 30 and 32, respectively (see FIG. 1). Referring to FIG. 2, each of the hydraulic cylinder means 42 comprises a cylinder 44 in which the press member 36 is vertically and movably arranged and acts as a piston. A compressed fluid such as compressed oil flows into or from a chamber 46 defined by the cylinder 44 and the press member 36 through a passage 48 connected to a duct 50. A plurality of, for example 4, bolts 52 are arranged upright through the spring supporting member 34 and the cylinder 44 and the spring supporting member 34 are fixed to a spacer 54 by the bolts 50. Reference numerals 56 and 57 denote an O-ring and a dust seal, respectively.

When the compressed oil is supplied into the chamber 46 of the cylinder 44 through the passage 48, the piston or press member 36 slides in the cylinder to press the leaf springs 12, 13 and 14. Then, the press member 36 and the spring supporting member 34 hold and clamp the leaf springs 12, 13 and 14 therebetween through the intermediate member 38. The force acting on the piston 36 can be controlled by controlling the pressure of the compressed oil to be supplied into the chamber 46. By controlling the force of the piston 36, the friction between the leaf springs 12 and 13 as well as the friction between the leaf springs 13 and 14 can be controlled. When the pressurized oil is drained, the force which clamps the leaf springs 12, 13 and 14 is released and the friction between the leaf springs is descreased. The clamping means 30, 32 and the hydraulic cylinder means 32 cooperate to clamp the ends of the leaf springs 12, 13 and 14 or to release the clamping force. Although vibration of a relatively large magnitude is produced directly in the vehicle body or on the axle, the vibration of the laminated leaf spring assembly 10 for suspending these parts is relatively small. In addition, the clamping means 30 and 32 are arranged not between the vehicle body or the axle and the laminated leaf spring assembly 10 but mounted directly on the assembly 10. Therefore, the clamping means 30 and 32 need not have very good vibration-proof properties and can be of a simple and compact structure.

The apparatus 28 for controlling the friction between the leaf springs further comprises a hydraulic control means 58, as shown in FIG. 1. The hydraulic control means 58 includes a control valve 60 for controlling the pressure of the compressed oil to be supplied into the chamber 46. The control valve 60 is connected through a duct 64 to a fluid source 62 for a cab tilt device 66. The control valve 60 serves to permit and interrupt flow of the compressed oil from the fluid source 64 to the duct 50. The cab tilt device 66 of a so-called cab-over-engine truck is well known and operates to tilt a driver's cab frontward when the truck is parked.

The control apparatus 28 further comprises a detector means 68, as shown in FIG. 1. The detector means 68 includes a comparator 70 and a pressure sensor 72. The pressure sensor 72 serves to sense the pressure of compressed oil for a power steering assembly 74. In the power steering assembly 74, a drop arm 76 of a power steering unit 78 is pivoted in accordance with the steering angle of a steering wheel 80. It is well known that steering power is increased by a hydraulic servo mechanism. When the vehicle runs straight, the compressed oil from the fluid source 82 is drained. When the steering wheel 80 is operated to turn the vehicle, the oil pressure corresponding to the difference between the steering angle of the steering wheel 80 and that of the drop arm 76 is produced in a duct 84. In this manner, when the steering wheel 80 is rotated to change the direction of the vehicle body, the pressure of the compressed oil in the duct 84 is increased. The increase in pressure is detected by the pressure sensor 72.

The comparator 70 serves to compare the pressure value issued from the pressure sensor 72 with a predetermined value. When the pressure value of the compressed oil exceeds the predetermined value, the comparator 70 issues a clamp signal to the control valve 60. A clamp signal can be issued any time on the rough road by actuating a manual switch 86.

In order to increase the friction between the leaf springs of the laminated leaf spring assembly 10 on the rough road, according to the control apparatus 28 of the structure as described above, the manual switch 86 is operated to issue a clamp signal. Then, the compressed oil from the fluid source 62 for the cab tilt device 66 flows through the control valve 60 into the duct 50 to press down the piston 36. The ends of the leaf springs 12, 13 and 14 are clamped against each other through the intermediate member 38 and the piston 36 acting as a pressure member, so that the friction between the leaf springs can be increased. Then, an equivalent damping coefficient is set to a high level to improve the damping characteristic as well as the comfort on the rough road.

On the smooth road, the manual switch 86 is operated in the opposite direction to disable the clamp signal from the comparator 70 and to operate the control valve 60. The compressed oil from the fluid source 62 is interrupted to block the pressure of the compressed oil in the duct 50. The force of the piston 36 clamping the leaf springs is released so that the friction between the leaf springs can be reduced. The dynamic spring constant is decreased and the comfort on the smooth road is improved.

When the steering wheel 80 is operated on the smooth road to make a turn or to pass another vehicle, the power steering assembly 74 is driven to increase the pressure of the compressed oil in the duct 84. The increase in pressure is detected by the pressure sensor 72. The detected value is compared with the predetermined value by the comparator 70. When the value of the oil pressure exceeds the predetermined value, that is, if the steering wheel 80 is rapidly rotated at a sharp turn, a clamp signal is issued from the comparator 70. The control valve 60 operates to press down the piston 36 as in the case on the rough road and to apply a clamping force to the leaf springs 12, 13 and 14. Therefore, the friction between the leaf springs is increased and the dynamic spring constant is set to a high value. The tilt of the body caused by the centrifugal force during a turn is suppressed and the driving stability can be greatly improved.

In this manner, good comfort is obtained both on a rough road and on a smooth road and excellent driving stability is ensured by the suspension system described above.

Use of a fluid source for a cab tilt device as a fluid source for driving the clamping means provides the following advantages. The clamping means 30 and 32 are operated only when the vehicle is running and the cab tilt device 66 is used only when it is parked. Therefore, the same fluid source 62 for cab tilt can be efficiently utilized both when the vehicle is parked and when it is running. In addition, no separate fluid source for the hydraulic cylinder means of the control apparatus is required so the structure is simplified.

The fluid source 62 for the cab tilt device 66 need not be used as a fluid source for the hydraulic cylinder means and any suitable fluid source may be used to move the piston of the hydraulic cylinder means.

The magnitude of the clamping force may be continuously or stepwise varied in accordance with the level of the oil pressure in the power steering assembly 74. The clamping force may be regulated by manual control 86 of the pressure of the compressed oil by the control valve 60. The speed of the vehicle may be also detected in addition to the oil pressure for power steering. In this case, the pressure of the compressed oil may be controlled in association with the vehicle speed.

As described above, in this invention, the increase in the power steering oil pressure at a turn is detected to control the friction between the leaf springs. The detecting system can be of an extremely simple structure as compared with that in which the speed of the vehicle and the steering angle of the steering wheel during operating are detected to control the friction between the leaf springs. Therefore, the detector means of the control apparatus can be simple in construction, improved in reliability, and inexpensive to manufacture. Since the friction between the leaf springs can be automatically increased in accordance with the steering angle of the steering wheel, excellent effects such as improvement in driving stability while turning or passing are provided.

What we claim is:

1. An apparatus for controlling the friction between leaf springs of a laminated leaf spring assembly of a vehicle, in which a power steering assembly is incorporated, comprising:

clamping means mounted on the laminated leaf spring assembly which is attached at both ends to a body, thus supporting the body, for clamping the laminated leaf spring assembly, said clamping means including a guide member and a press member which clamp the laminated leaf spring assembly therebetween;

hydraulic cylinder means for pressing said press member to thereby urge said laminated leaf spring assembly against said guide member, said hydraulic cylinder means including a cylinder;

hydraulic controlling means including a control valve for controlling the pressure of compressed oil supplied to said cylinder of said hydraulic cylinder means; and detecting means including a pressure sensor for sensing the pressure of the compressed oil acting on said power steering assembly and a comparator for comparing a signal from said pressure sensor with a predetermined value and for supplying a signal corresponding to the sensed pressure to said control valve when the sensed pressure exceeds the predetermined value.

2. A control apparatus according to claim 1, wherein said detecting means further includes manually switching means for cutting off the signal from said pressure sensor to said comparator and for supplying the signal to said control valve.

3. A control apparatus according to claim 2, wherein a cab tilt device is further incorporated in the vehicle, said hydraulic cylinder means does not have a proper fluid source, a fluid source for said cab tilt device is connected to said control valve, and the compressed fluid from said fluid source for said cab tilt device is supplied to said hydraulic cylinder means through said control valve.

* * * * *